(12) United States Patent
Long et al.

(10) Patent No.: US 6,767,100 B1
(45) Date of Patent: Jul. 27, 2004

(54) SYSTEM AND METHOD EMPLOYING REFLECTIVE IMAGING DEVICES FOR A PROJECTION DISPLAY

(75) Inventors: Paul V. Long, Newberg, OR (US); David E. Slobodin, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/027,784

(22) Filed: Dec. 19, 2001

(51) Int. Cl.[7] .................. G03B 21/00; G03B 21/26; G03B 21/28; G02B 21/18
(52) U.S. Cl. .................. 353/31; 353/33; 353/34; 353/99; 353/38; 359/372
(58) Field of Search .................. 353/30–31, 33–34, 353/38, 98–99; 359/372; 349/5, 8

(56) References Cited

U.S. PATENT DOCUMENTS

| | | | | |
|---|---|---|---|---|
| 5,159,485 A | * | 10/1992 | Nelson .................. 359/291 |
| 5,319,214 A | * | 6/1994 | Gregory et al. .......... 250/504 R |
| 5,424,868 A | * | 6/1995 | Fielding et al. .......... 359/634 |
| 5,442,414 A | * | 8/1995 | Janssen et al. .......... 353/33 |
| 5,658,060 A | * | 8/1997 | Dove .................. 353/33 |
| 5,704,701 A | * | 1/1998 | Kavanagh et al. .......... 353/33 |
| 5,706,061 A | | 1/1998 | Marshall et al. .......... 348/743 |
| 5,760,875 A | * | 6/1998 | Daijogo et al. .......... 353/31 |
| 5,808,800 A | | 9/1998 | Handschy et al. .......... 359/630 |
| 5,826,959 A | * | 10/1998 | Atsuchi .................. 353/20 |
| 5,875,008 A | * | 2/1999 | Takahara et al. .......... 349/5 |
| 5,971,545 A | | 10/1999 | Haitz .................. 353/31 |
| 6,046,858 A | | 4/2000 | Scott et al. .......... 359/634 |
| 6,076,931 A | * | 6/2000 | Bone et al. .......... 353/100 |
| 6,100,103 A | * | 8/2000 | Shim et al. .......... 438/26 |
| 6,129,437 A | * | 10/2000 | Koga et al. .......... 353/98 |
| 6,147,790 A | * | 11/2000 | Meier et al. .......... 359/291 |
| 6,155,687 A | * | 12/2000 | Peterson .................. 353/84 |
| 6,179,424 B1 | * | 1/2001 | Sawamura .......... 353/33 |
| 6,224,216 B1 | * | 5/2001 | Parker et al. .......... 353/31 |
| 6,262,851 B1 | * | 7/2001 | Marshall .................. 359/634 |
| 6,318,863 B1 | * | 11/2001 | Tiao et al. .......... 353/31 |
| 6,371,617 B1 | * | 4/2002 | Nishida et al. .......... 353/122 |
| 6,396,619 B1 | * | 5/2002 | Huibers et al. .......... 359/291 |
| 6,419,365 B1 | * | 7/2002 | Potekev et al. .......... 353/98 |
| 6,457,829 B1 | * | 10/2002 | Nakazawa et al. .......... 353/31 |
| 6,525,759 B2 | * | 2/2003 | Kawai .................. 347/239 |
| 6,526,198 B1 | * | 2/2003 | Wu et al. .................. 385/18 |
| 6,601,959 B2 | * | 8/2003 | Miyata et al. .......... 353/98 |

OTHER PUBLICATIONS

"Application of DLP™ Technology to Digital Electronic Cinema—A Progress Report", Werner and Dewald, Texas Instruments, Inc., Plano, Texas, circa 1998 (inferred from "references" section).

* cited by examiner

Primary Examiner—Russell Adams
Assistant Examiner—Magda Cruz
(74) Attorney, Agent, or Firm—Schwabe, Williamson & Wyatt, P.C.

(57) ABSTRACT

Projected systems (10, 12, 14, 16) include light source apparatuses (20, 24, 26) for programming narrow bands of unpolarized blue, green, and red light to associated reflective imaging devices that reflect selected patterns of the blue, green, and red light into a dichroic cross-combiner assembly (70, 72, 74), which recombines the light into a composite image and directs it into a projection lens (90) The reflective imaging devices are preferably micromirror displays (50, 51) having an array of pivotable micromirrors (52, 53) that direct on-state micromirror light to the projection lens and direct off-state micromirror light to a light absorbing surface (84).

23 Claims, 6 Drawing Sheets

SYSTEM AND METHOD EMPLOYING REFLECTIVE IMAGING DEVICES FOR A PROJECTION DISPLAY

TECHNICAL FIELD

This invention relates to image projection displays and more particularly to systems and methods that utilize reflective imaging devices in combination with a dichroic cross-combiner assembly.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals, and the signals are electronically conditioned and processed to control an image-forming device, such as a liquid crystal display ("LCD") or a digital micromirror display device ("MDD").

A popular type of multimedia projection system employs a broad spectrum light source and optical path components upstream and downstream of the image-forming device to project the image onto a display screen. An example of a MDD-based multimedia projector is the model LP420 manufactured by in Focus Systems, Inc., of Wilsonville, Oreg., the assignee of this application.

Significant effort has been invested into developing projectors producing bright, high-quality, color images that are also compact so that they can be portable. However, it is desirable to further decrease the size and weight of such projectors. Furthermore, conventional projectors, which use high pressure mercury arc lamps, have lamp lifetimes of roughly 2000 hours. It is desirable to use a light source with lifetime in excess of 10,000 hours so that the user need not worry about failure of the projector or the cost and effort of lamp replacement.

An alternative optical architecture is, therefore, desired that substantially decreases the size and weight of the projection system as compared with conventional projection systems and significantly enhances light source lifetime.

SUMMARY OF THE INVENTION

An object of this invention is, therefore, to provide a system and method for projecting an image that results in a decrease of size and weight and longer light source lifetime as compared with conventional technology.

Another object of the invention is to employ long life solid state light sources in a projector.

Yet another object is to employ reflective imaging devices in a projection display system to reflect light received from a light source to a projection lens via a cross-combiner assembly to provide a compact projection system.

Several embodiments of an image projection system are disclosed. Each embodiment includes a light source apparatus, three reflective imaging devices, a dichroic cross-combiner assembly, and a projection lens.

The light source apparatus is either three separate light sources that deliver blue, green, and red light or a polychromatic light source that delivers all three colors, each color preferably in a narrow wavelength band.

The blue, green, and red light is separately delivered to the respective reflective imaging devices. The reflective imaging devices are preferably MDDs, of which two different types are disclosed. Both micromirror displays have an array of quadrilateral mirrors that are pivotable, but one has mirrors that pivot on a diagonal axis and the other has mirrors that pivot on a longitudinally centered axis.

As indicated above, all of the embodiments utilize a dichroic cross-combiner assembly to combine the blue, green, and red light to form a composite image directed toward the projection lens. When the light source apparatus is three separate light sources that separately deliver narrow bands of blue, green, and red light, then the dichroic cross-combiner assembly is essentially a conventional X-cube that can operate with unpolarized light.

In other embodiments of this invention, the light source apparatus is a multicolor light source and the dichroic cross-combiner assembly has different configurations. The multicolor light source preferably produces narrow band spectra of blue, red, and green light. In a system that utilizes the multicolor light source with MDDs having mirrors that pivot on a longitudinally centered axis, the dichroic cross-combiner assembly has elongated rectangular sides that direct the light to the appropriate MDD and recombine the light after the displays reflect the light back into the dichroic cross-combiner assembly.

In a system that utilizes the multicolor light source with MDDs having mirrors that pivot on a diagonal axis, the dichroic cross-combiner assembly preferably includes two axially stacked X-cubes that are rotated slightly out of alignment. The bottom cube directs the light at an oblique angle to the appropriate MDD, and the top cube recombines the light after the MDDs reflect the light back into the top cube of the dichroic cross-combiner assembly.

A pair of optional lenses is preferably positioned in the optical pathway between the light source apparatus and the reflective imaging devices. The optional pair of lenses includes an anamorphic beam expanding lens and an anamorphic collimating lens. For a system with a light source apparatus that comprises three light sources there are preferably three pairs of these optional lenses. When the light source apparatus is a multicolor light source then only a single pair is needed which is positioned between the multicolor light source and the side of the dichroic cross-combiner assembly. Note that the light delivered from the light source apparatus arrives at each MDD at an oblique angle. This oblique angle is required to maintain separate paths of the light beams incident on, and reflected by, the MDD. Light reflected by "on" pixels of the MDD is directed into the projection lens. The lenses between the light source and the MDD are configured such that it is uniformly illuminated, and illumination overfill is minimized.

It also preferably to employ an optional field lens between each MDD and the opposing side of the dichroic cross-combiner assembly to help direct the light in a focused configuration. Such field lenses enable the projection lens to be smaller because the light is delivered in a focused configuration.

The projection lens is preferably held in a frame that has a light-absorbing surface and that is positioned in a lens barrel. Use of a light absorbing surface in close proximity to the projection lens enables the pivotable mirrors of the MDDs to direct the light into the projection lens or, alternately, direct or "dump" the light to the light absorbing surface.

Additional objects and advantages of this invention will be apparent from the following detailed description of a preferred embodiment thereof that proceeds with reference to the accompanying drawings.

DETAILED DESCRIPTION OF PREFERRED EMBODIMENTS

FIGS. 1A, 2A, 3, and 4 show various embodiments of respective image projection systems 10, 12, 14, and 16. The main components of each of these systems are a light source apparatus 20; three reflective imaging devices 50B, 50G, and 50R (the B, G, and R suffixes refer herein to respective blue, green, and red light wavelengths); a dichroic cross-combiner assembly 70; and a projection lens 80. These components are described with reference to each embodiment. As described below with reference to FIGS. 5 and 6, other components include an optional anamorphic beam expanding lens 30 and an optional anamorphic collimating lens 40. Projection systems 10, 12, 14, and 16 also preferably include optional field lenses 60B, 60G, and 60R. Additionally, projection lens 80 is preferably held in a frame 82 having a light-absorbing surface 84 that is positioned in a lens barrel 90.

Figure 1A:
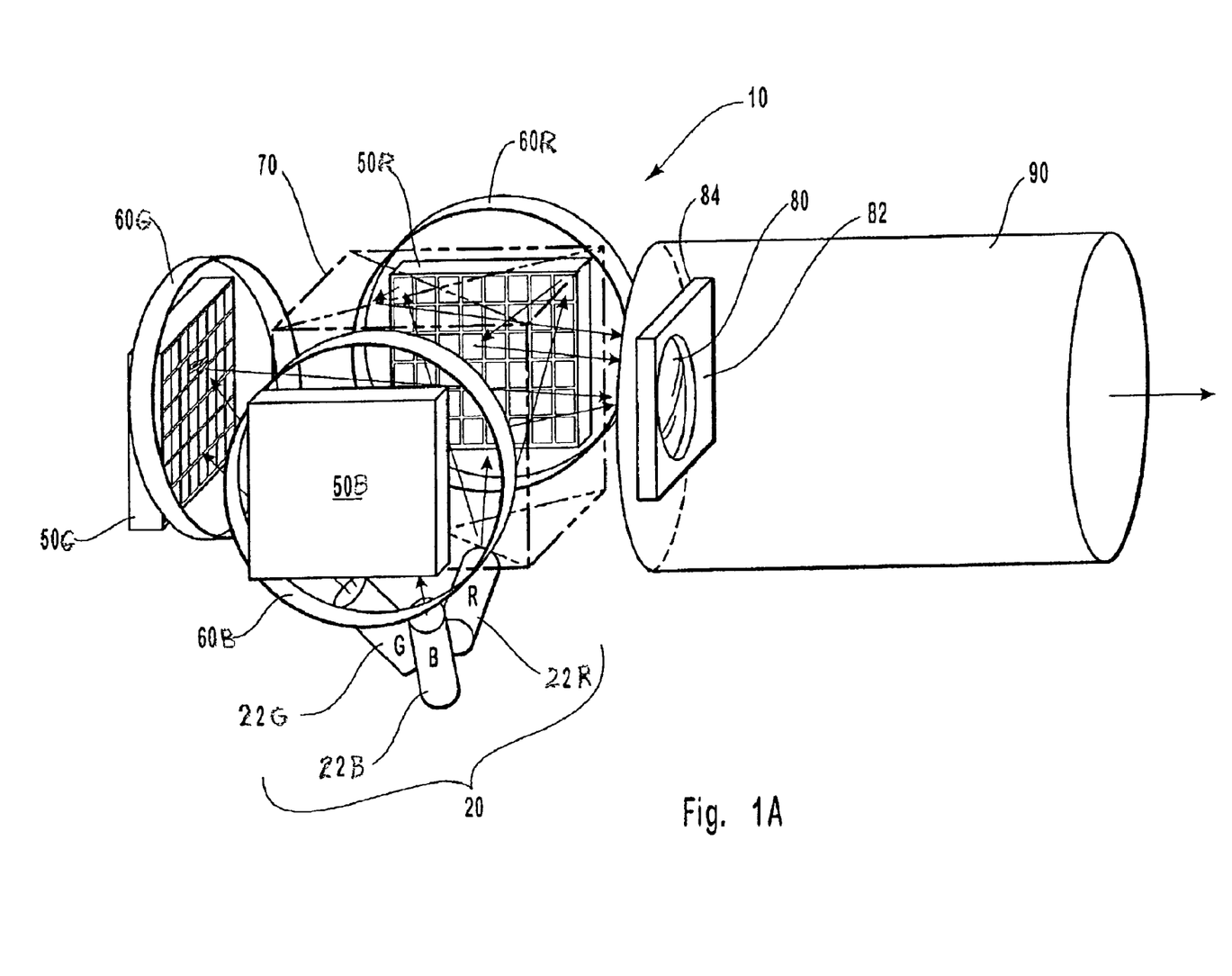
FIG. 1A is a simplified oblique view representing an optical engine of this invention for a multimedia projector having three individual colored light sources directed to three respective MDDs that reflect the light through a dichroic cross-combiner assembly to a projection lens.

As shown in FIG. 1A, projection system 10 has a light source apparatus 20 that includes three light sources, namely a blue light source 22B, a green light source 22G, and a red light source 22R. This invention employs a light source apparatus that delivers desired wavelengths, such as of the primary colors, rather than starting with a broadband light source and filtering out the undesired wavelengths. As discussed below, each light source has a narrow band spectrum, with most light of each color spanning an 80 nm band.

Light source apparatus 20, more specifically light sources 22B, 22G, and 22R, are positioned to respectively illuminate the three reflective imaging devices 50B, 50G, and 50R to reflect the blue, green, and red light through dichroic cross-combiner assembly 70. Dichroic cross-combiner assembly 70 is an X-cube designed and adapted to simultaneously receive unpolarized, narrow bandwidth blue, green, and red light from the respective reflective imaging devices 50B, 50G, and 50R, and to combine the blue, green, and red light to form a composite image directed toward projection lens 80. Conventional X-cubes typically operate with a broadband, polychromatic light source, which requires polarization to optimize light propagation and contrast ratio through the X-cube. Unfortunately, polarizing the illumination light typically causes light transmission losses and a reduction of contrast ratio.

The three light sources of light source apparatus 20 are preferably LED arrays. However the three light sources may alternatively include lasers, such as diode lasers, or any other appropriate light sources that provide the particular wavelengths of light. The preferred LEDs arrays are preferably configured as describes in U.S. Pat. No. 6,224,216 for SYSTEM AND METHOD EMPLOYING LED LIGHT SOURCES FOR A PROJECTION DISPLAY, which is assigned to the assignee of this application and incorporated herein by reference.

Advantages of employing LEDs include longer operational life, fewer thermal issues than arc lamps, purer primary colors, faster electronic sequencing of the colors for better color saturation, and dynamic adjustment of the color temperature by directly controlling the amount of blue, green, and red light generated.

Example LED light sources suitable for use are the red, green and blue, high flux surface mount LEDs having Part Nos. HSMB-HR00, HSMB-HM00, and HSMB-HB00, which are manufactured by Lumileds, Inc. of San Jose, Calif. These LEDs are narrow band emitters having full-width half-maximum spectra (FWHM) of less than 40 nm. These narrow band spectra allow employing X-cubes without polarizing the light and encountering its disadvantages. Moreover, operating the X-cubes with narrow band spectra allows them to efficiently propagate light over a wider range of incident angles.

Figure 2A:
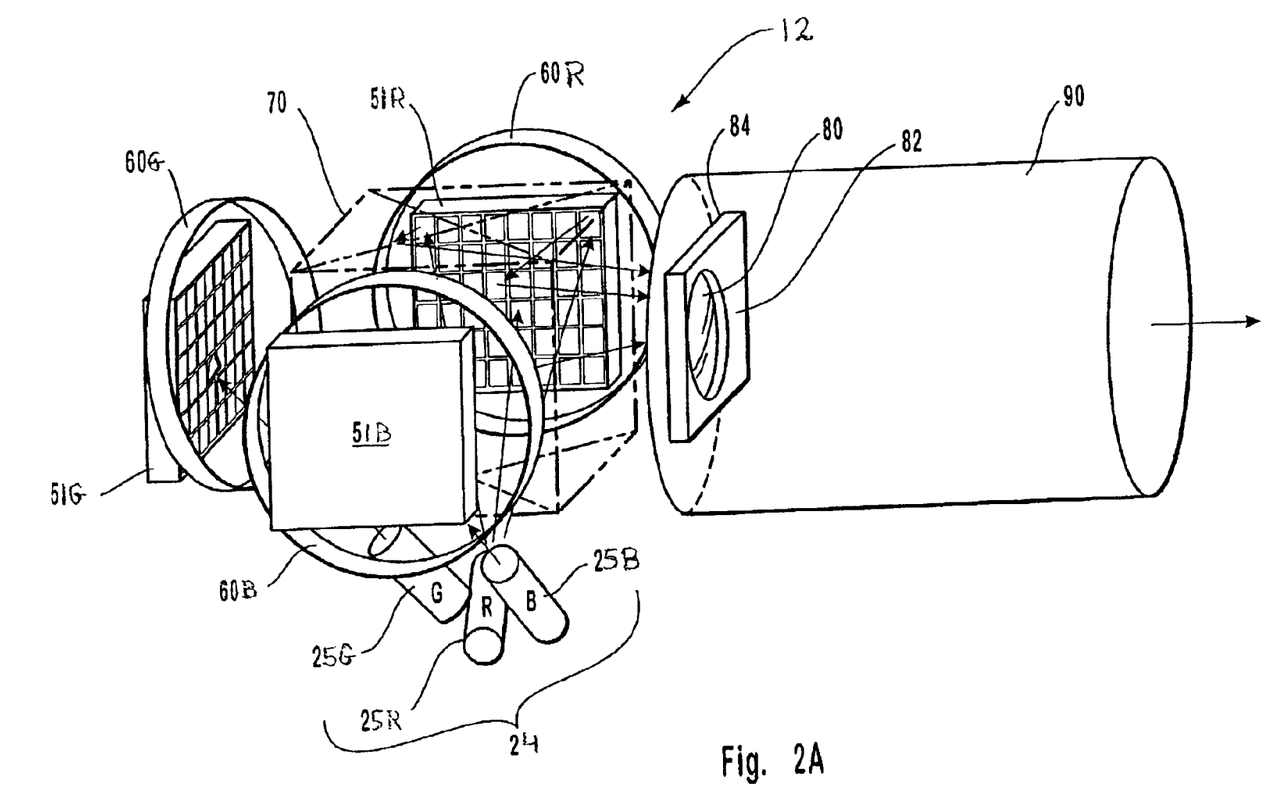
FIG. 2A is a simplified oblique view of another optical engine of this invention for a multimedia projector having three individual colored light sources directed to three respective MDDS which reflect the light through a dichroic cross-combiner assembly to a projection lens.
Figure 3:
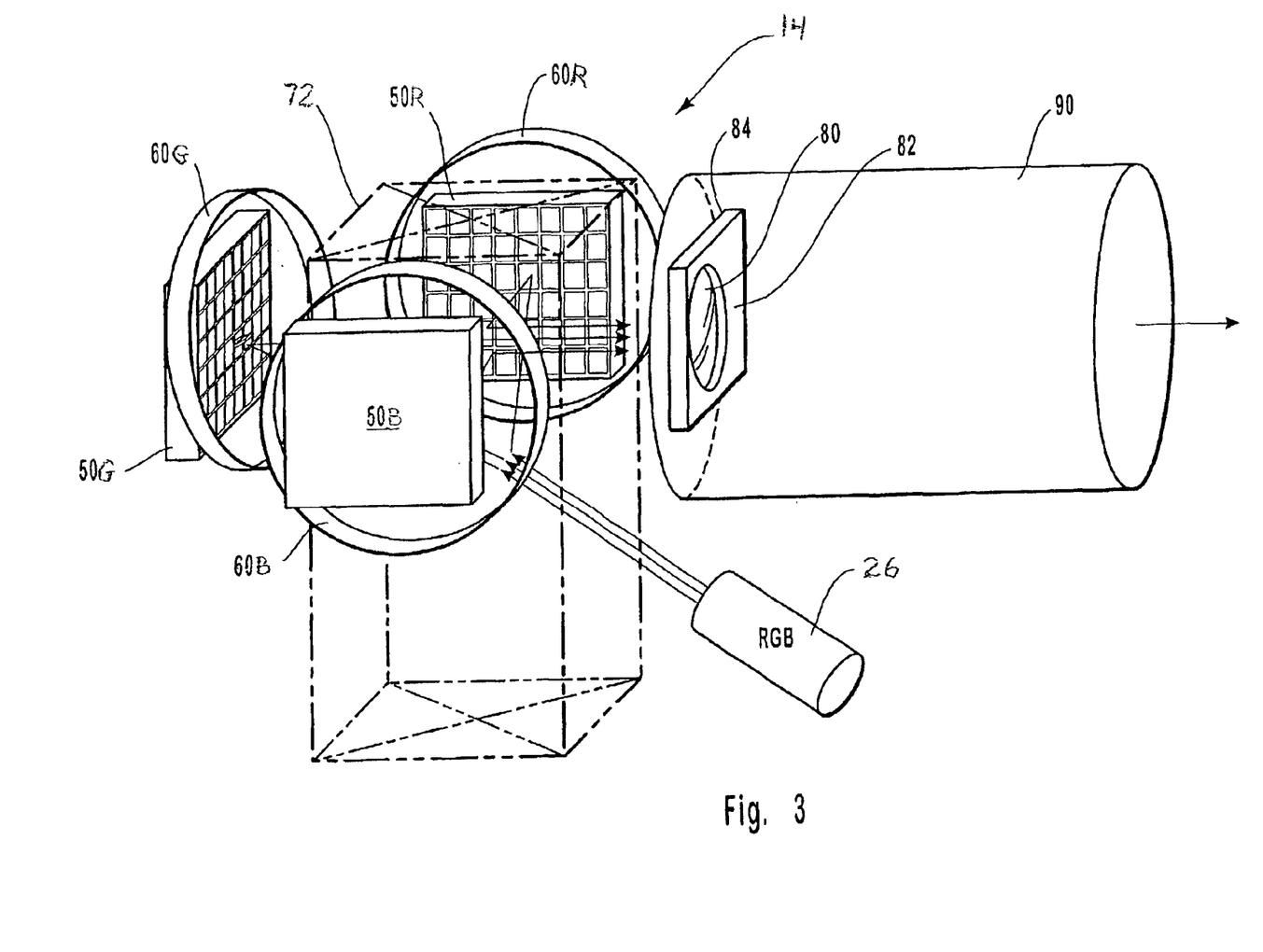
FIG. 3 is a simplified oblique view of yet another optical engine of this invention for a multimedia projector having a multicolor light source directed to three respective MDDs that reflect the light through a dichroic cross-combiner assembly to a projection lens. The MDDs each have an array of digitally deflected mirrors that pivot about hinges aligned parallel to a longitudinal axis of the mirrors.
Figure 4:
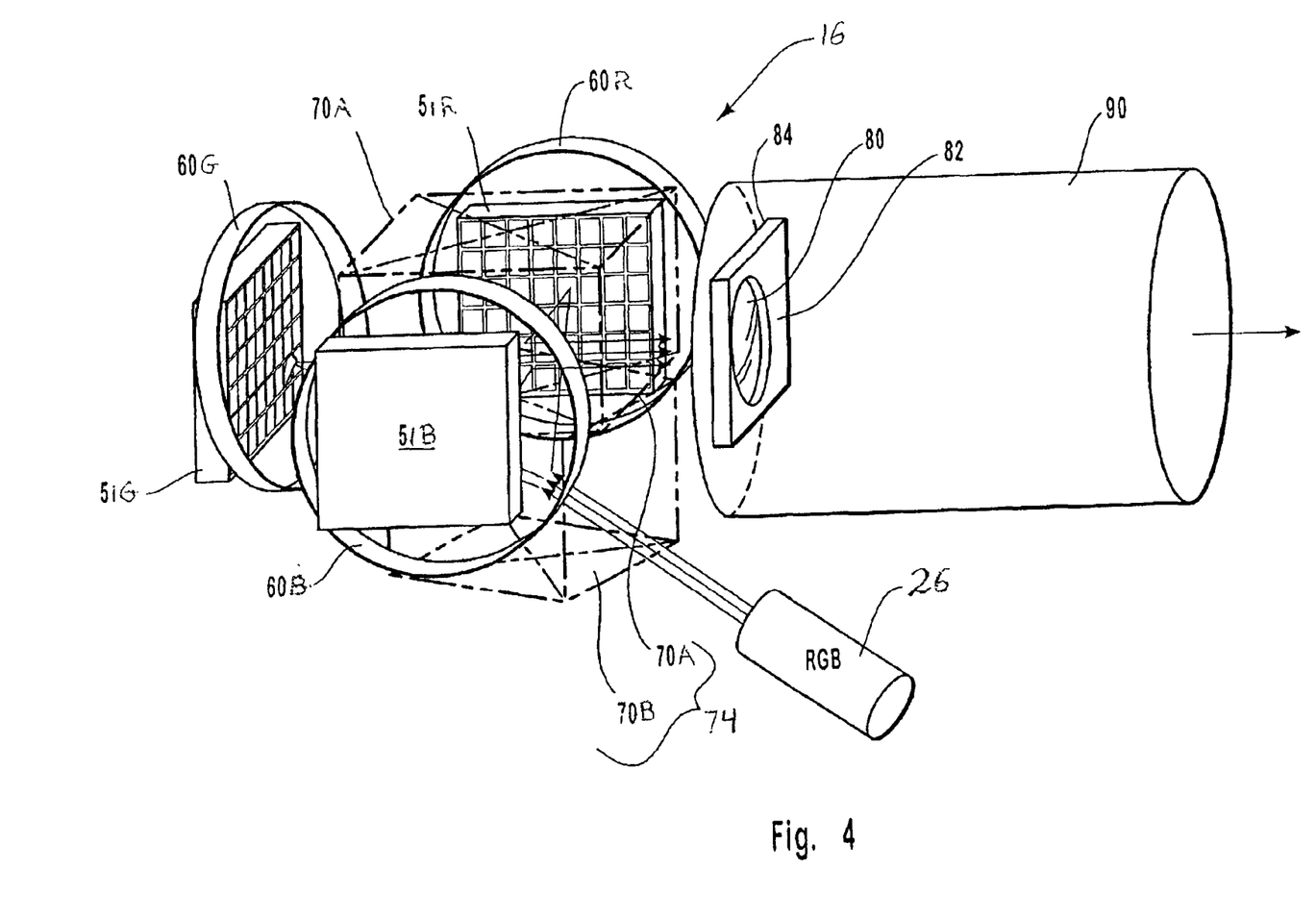
FIG. 4 is a simplified oblique view of still another optical engine of this invention for a multimedia projector having a multicolor light source directed to three respective MDDs that reflect the light through a dichroic cross-combiner assembly to a projection lens. Each MDD has an array of digitally deflected mirrors that pivot about hinges aligned diagonally across each mirror and also depicting one of the mirrors in a pivoted position.

The system of FIG. 1A is shown without the optional anamorphic lenses described with reference to FIGS. 5 and 6. However, skilled workers will understand that the light propagating from light source 22B, 22G, and 22R is preferably homogenized and optically processed by optional lenses before illuminating MDDs 50B, 50G, and 50R. As described below with reference to FIGS. 5 and 6, the optional lenses include an anamorphic beam expanding lens 30 and an anamorphic collimating lens 40 that coact to expand and collimate the light to uniformly and completely illuminate, but not significantly overfill, the entire reflective surface of each of MDDs 50. Accordingly, projection system 10 preferably includes three pairs of optional lenses 30 and 40 with each pair being positioned between a light source 22 and a corresponding MDD 50. The alternative display system embodiments shown in FIGS. 2A, 3, and 4 are also shown without optional lenses, however, these systems also preferably utilize the lenses 30 and 40 to fully illuminate the respective MDDs. Alternatively, properly shaped, uniform illumination of obliquely illuminated MDDs can also be achieved by imaging on the MDDs the light propagating from asymmetrical light tunnels or asymmetrical fiber optic bundles that are shaped to compensate for oblique illumination angles.

Figure 1B:
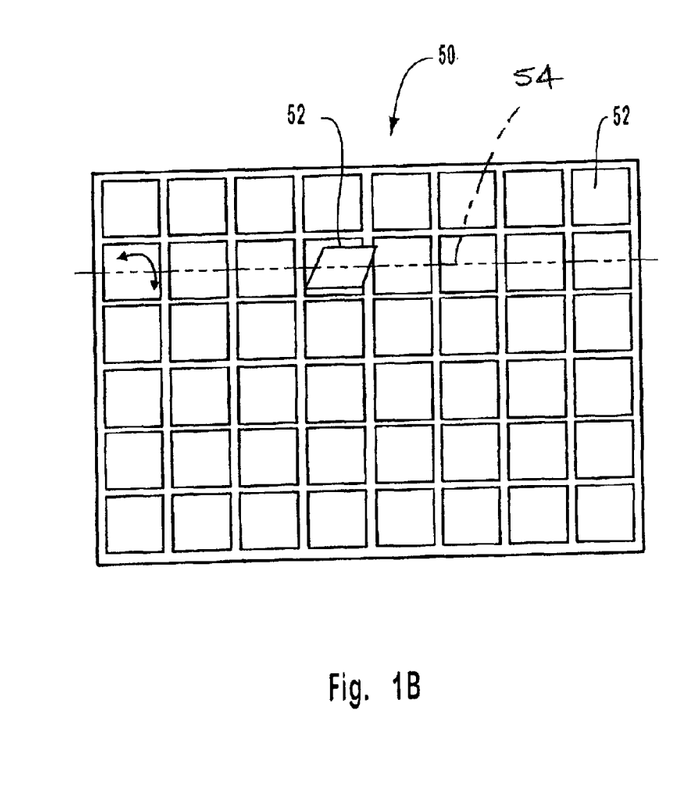
FIG. 1B is a plan view of one of the three MDDs of FIG. 1A depicting an array of digitally deflected mirrors that pivot about hinges aligned parallel to a longitudinal axis of the mirrors and also depicting one of the mirrors in a pivoted position.

Each of MDDs 50B, 60G, and 50R includes an array of digitally deflected micromirrors. Each micromirror 52 has a quadrilateral shape, such as square or rectangular. As shown in FIG. 1B for MDD 50G, micromirrors 52G are each pivotable about a longitudinally centered axis 54. This axial rotation enables micromirrors 52 to receive the blue, green, and red light at oblique angles of incidence and then, depending on their deflection angle, reflect the light through dichroic cross-combiner assembly 70 and projection lens 80 or, alternately, onto light absorbing surface 84 of frame 82. Stated otherwise, micromirrors 52B, 52G, and 52R are adapted to selectively reflect pixels of blue, green, and red light either into projection lens 80 or towards a light-absorbing surface in proximity to projection lens 80, depending on whether micromirrors 52 are in an "on" or an "off" state, respectively.

Of course, this invention is also applicable to reflective LCDs, provided that the light illuminating the LCDs is properly polarized and there are polarizers at the three input faces of the cross-combiner assemblies. An advantage of using MDDs or other micromechanical displays instead of reflective LCDs is that reflective LCDs have significant light transmission losses. Additionally, the illumination light need not be polarized, thereby increasing the brightness of a projected image, increasing the projector luminous efficiency, and decreasing the cost. Not using polarized light also avoids problems with dichroic coatings and birefringence-causing stress in glass optical elements, which tend to depolarize the light and reduce image contrast. Therefore, employing MDDs provides greater screen brightness for a given light source brightness.

A set of optional field lenses 60B, 60G, and 60R are preferably positioned between MDDs 50B, 50G, and 50R and the facing surfaces of dichroic cross-combiner assembly 70 to direct the illumination and reflected light in focused, compact bundles so that projection lens 80 can be smaller and, therefore, less expensive while maintaining its speed.

FIG. 2A shows a projection system 12 that is similar to projection system 10 except for a light source apparatus 24 and MDDs 51B, 51G, and 51R. Projection system 12 also preferably includes three pairs of optional lenses 30 and 40 for properly illuminating MDDs 51.

Light source apparatus 24 includes light sources 25B, 25G, and 25R, which are essentially identical to light sources 22B, 22G, and 22R except for being positioned in a different plane and angle relative to MDDs 51 and projection lens 80. In particular, light sources 25B, 25G, and 25R are positioned below dichroic cross-combiner assembly 70 and are oriented to obliquely illuminate the digitally deflected micromirrors of MDDs 51B, 51G, and 51R.

Figure 2B:
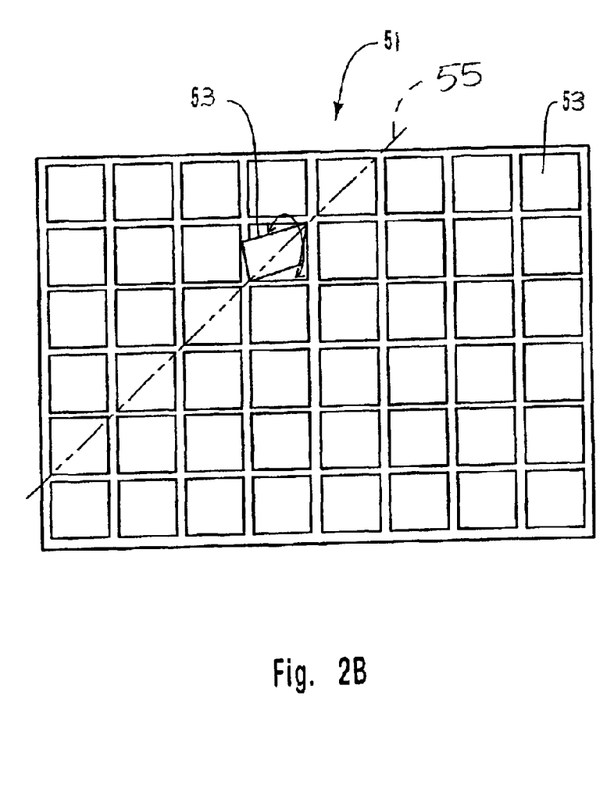
FIG. 2B is a plan view of one of the three MDDs of FIG. 2A depicting the array of digitally deflected mirrors that pivot about hinges aligned diagonally across each mirror and also depicting one of the mirrors in a pivoted position.

Referring to FIG. 2B, MDDs 51 include micromirrors 53 that are shaped like micromirrors 52 of MDDs 50. However, micromirrors 53 are each pivotable about a diagonal axis 55. As in projection system 10, projection system 12 includes projection lens 80 held by frame 82 which has at least a front surface that includes light absorbing surface 84. Projection lens 80 need not be held by a frame with a light absorbing surface if there is a preferable light absorbing surface in close proximity.

FIG. 3 shows a projection system 14 that shares many of the same components as projection system 10. Differing components include a light source apparatus 26 and a dichroic cross-combiner assembly 72.

Unlike light sources 20 and 24, light source apparatus 26 is a multicolor light source that provides red, green and blue light, preferably in narrow wavelength bands. Light source apparatus 26 directs the light obliquely from a location lower than lens barrel 90 toward front surface of the dichroic cross-combiner assembly 72 that faces projection lens 80. Dichroic cross-combiner assembly 72 is essentially an elongated X-cube having four major rectangular surfaces. Dichroic cross-combiner assembly 72 includes dichroic coatings that enable the blue, green, and red light to enter the front surface, be split apart by color and directed to the corresponding MDDs 50B, 50G, and 50R, micromirrors 54 of which then reflect the blue, green, and red light back into dichroic cross-combiner assembly 72 for recombination of the blue, green, and red light to form a composite image directed into projection lens 80.

FIG. 4 shows a projection system 16 that employs light source apparatus 26 as in projection system 14. However, rather than employing MDDs 50B, 50G, and 50R having micromirrors 52 that pivot about longitudinally centered axis 54 (FIG. 1B), projection system 16 employs MDDs 51B, 51G, and 51R having micromirrors 53 that pivot about diagonal axis 55 (FIG. 2B). This requires a repositioning of light source 26 to accommodate the oblique illumination of MDDs 51. Accordingly, projection system 16 employs a dichroic cross-combiner assembly 74 that includes two stacked X-cubes 70A and 70B that are coaxial positioned with X-cube 70A mounted above X-cube 70B. X-cube 70A is aligned with its surfaces substantially parallel to MDDs 51 and X-cube 70B is rotated slightly out of alignment with X-cube 70A to accommodate the oblique illumination of MDDs 51. The blue, green, and red light propagating from light source apparatus 26 obliquely enters the frontal side of lower X-cube 70B, the dichroic coatings of which separate and redirect the blue, green, and red light to the corresponding MDD 51B, 51G, and 51 R. MDDs 51 B, 51G, and 51R then selectively reflect the blue, green, and red light into upper dichroic cross-combiner assembly 70A, which recombines the blue, green, and red light to form a composite image directed toward projection lens 80.

Figures 5, 6:
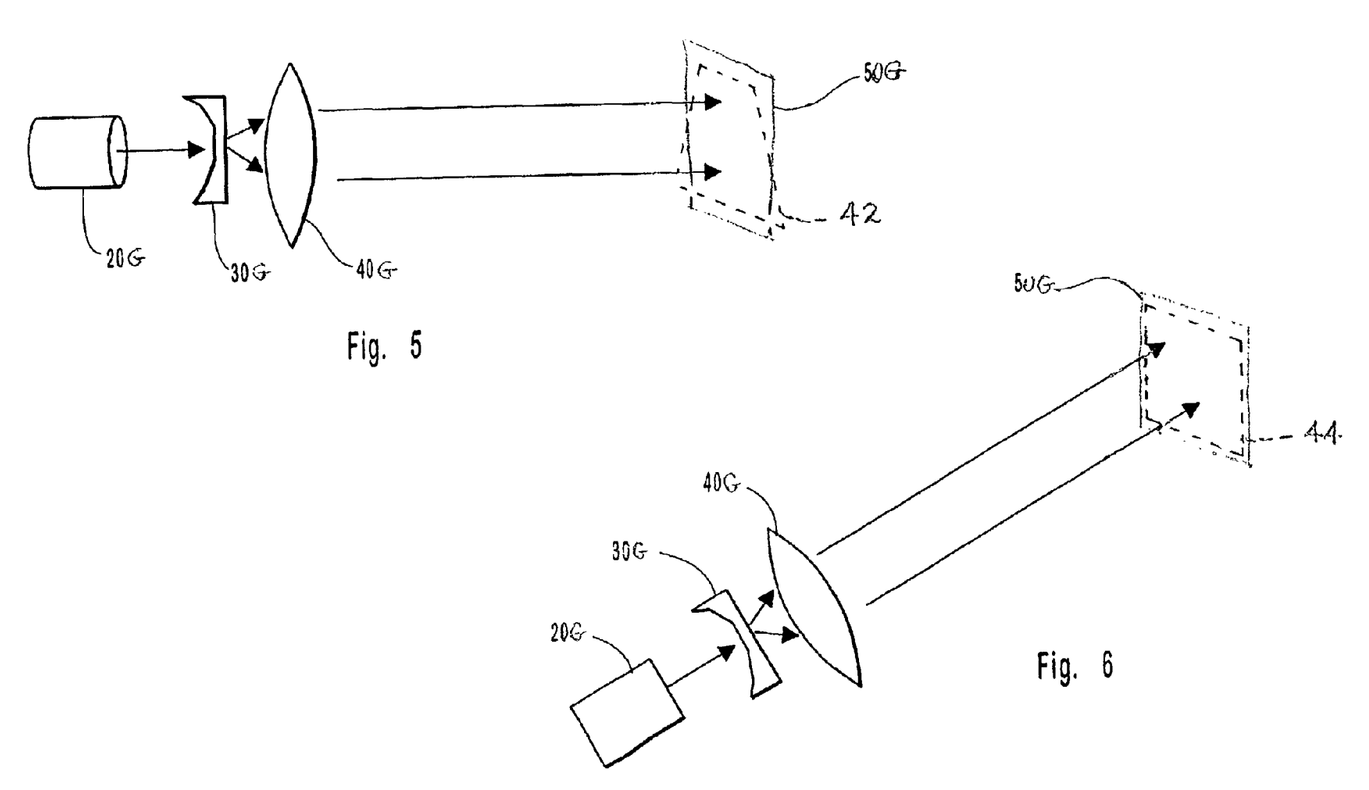
FIG. 5 is a simplified oblique pictorial view representing the light sources of FIGS. 1A, 2A, 3 and 4 showing a trapezoidal illumination pattern projected on a normal surface by an anamorphic beam expanding lens and an anamorphic collimating lens of this invention.
FIG. 6 is a simplified oblique pictorial view representing a substantially rectangular illumination pattern projected on an obliquely positioned MDD by the anamorphic beam expanding lens and the anamorphic collimating lens of FIG. 5.

FIGS. 5 and 6 show how to compensate for the illumination overfill caused by the oblique illumination of a display device by a light source. Both FIGS. 5 and 6 show a light source, such as green light source 20G directing light through optional pair of lenses 30 and 40 for expanding and collimating the light. Lens 30 is an anamorphic beam expanding lens and lens 40 is an anamorphic collimating lens. Without optional lenses 30 and 40, oblique illumination of a display device by light source 20G would result in trapezoidal distortion ("keystoning") of the illumination pattern on the display device.

FIG. 5 shows how anamorphic beam expanding lens 30 and anamorphic collimating lens 40 can intentionally predistort the illumination pattern to compensate for the above-described keystoning. FIG. 5 shows the illumination pattern that results when light from light source 20G is directed through anamorphic beam expanding lens 30 and anamorphic collimating lens 40 and projected orthogonally onto a display device, such as MDD 50G. A predistorted illumination pattern 42 (shown in dashed lines) is cast on MDD 50G.

FIG. 6 shows the resulting illumination pattern when light from light source 20G is directed at an oblique angle through anamorphic beam expanding lens 30 and anamorphic collimating lens 40 onto MDD 50G. A distortion compensated illumination pattern 44 results that is uniform, rectangular, and has minimal illumination overfill or underfill. This rectangular configuration preferably corresponds with the shape and aspect ratio of MDDs 50B, 50G, and 50R.

The above-described projection systems provide an oblique angle of incidence with respect to the particular reflective imaging devices employed to result in distortion compensated illumination pattern 44. More particularly, the orientations of light source apparatuses 20, 24, and 26 enable light to be directed to the reflective imaging devices at an oblique angle of incidence while maintaining illumination efficiency and uniformity as the light passes through the projection system.

It will be obvious to those having skill in the art that many changes may be made to the details of the above-described embodiments of this invention without departing from the underlying principles thereof. The scope of this invention should, therefore, be determined only by the following claims.

What is claimed is:

1. An image projection system, comprising:
    a projection lens;
    a dichroic cross-combiner assembly having outer surfaces with one outer surface facing the projection lens;
    three micromirror display devices, each including an array of digitally deflected mirrors positioned facing an outer surface of the dichroic cross-combiner assembly; and
    a coherent light source apparatus to generate blue, green, and red light, with the coherent light source apparatus being positioned at a location and in a manner such that the generated blue, green, and red light are provided to the three micromirror display devices respectively, without passing through the dichroic cross-combiner assembly, and the three micromirror display devices in turn reflecting the blue, green, and red light through the dichroic cross-combiner assembly toward the projection lens.

2. The image projection system of claim 1, further comprising three pairs of lenses, each pair including an anamorphic beam expanding lens and an anamorphic collimating lens, each pair being positioned between one of the three coherent light sources and one of the three micromirror display devices.

3. The image projection system of claim 1 in which the coherent light source includes light-emitting diodes.

4. The image projection system of claim 1 in which the coherent light source includes lasers.

5. The image projection system of claim 1 in which the digitally deflected mirrors are each quadrilateral and pivotable about a diagonal axis.

6. The image projection system of claim 1 in which the digitally deflected mirrors are each quadrilateral and pivotable about a longitudinally centered axis.

7. The image projection system of claim 1 in which the coherent light source apparatus is positioned such that the three micromirror display devices respectively receive blue, green, and red light at an oblique angle of incidence.

8. The image projection system of claim 1 in which the coherent light source apparatus is positioned below the dichroic cross-combiner assembly.

9. The image projection system of claim 1 in which each micromirror display device includes reflective pixels that are adapted to selectively reflect the respective blue, green, and red light towards one of the projection lens or a light-absorbing surface in proximity to the projection lens.

10. The image projection system of claim 9 in which the light-absorbing surface is positioned on a frame around the projection lens.

11. The image projection system of claim 1 in which the dichroic cross-combiner assembly includes an X-cube.

12. The image projection system of claim 1 in which the sides of the dichroic cross-combiner assembly are rectangular.

13. The image projection system of claim 1 in which the dichroic cross-combiner assembly comprises two X-cubes.

14. The image projection system of claim 1 in which the dichroic cross-combiner assembly is adapted to simultaneously receive the blue, green, and red light from the respective micromirror display devices and to combine the blue, green, and red light to form a composite image directed toward the projection lens.

15. The image projection system of claim 1 further comprising three field lenses, in which each field lens is positioned between one of the three micromirror display devices and one of the outer surfaces of the dichroic cross-combiner assembly.

16. The image projection system of claim 1 in which each of the blue, green, and red light has a full-width half-maximum spectra of less than 40 nanometers.

17. A method for projecting color display information, comprising:
    directing from a location, blue, green, and red coherent light respectively toward three micromirror display devices, avoiding a dichroic cross-combiner assembly;
    reflecting the blue, green, and read coherent light from the three micromirror display devices into the avoided diachronic cross-combiner assembly;
    simultaneously combining the blue, green, and red coherent light from the respective micromirror display devices in the dichroic cross-combiner assembly to form a composite image; and
    directing the composite image toward a projection lens.

18. The method of claim 17 further including obliquely directing the blue, green, and red light toward the three micromirror display devices respectively, avoiding the dichroic cross-combiner assembly.

19. The method of claim 17 further comprising expanding and collimating the blue, green, and red coherent light, before the blue, green, and red coherent light reach the three respective micromirror display devices.

20. An image projection system, comprising:
    a projection lens;
    a dichroic cross-combiner assembly having a top outer surface, a bottom outer surface, and a plurality of side outer surfaces with one of the side outer surfaces facing the projection lens;
    three micromirror display devices, each including an array of digitally deflected mirrors positioned facing a corresponding one of the other side outer surfaces of the dichroic cross-combiner assembly; and a coherent light source apparatus, positioned at a location directly under the projection lens, to generate blue, green, and red light, with the coherent light source apparatus being positioned such that the generated blue, green, and red light are provided to three side outer surfaces facing micromirror display devices respectively, through the dichroic cross-combiner assembly, and the three micromirror display devices in turn reflecting the blue, green, and red light through the dichroic cross-combiner assembly again, toward the projection lens.

21. The image projection system of claim 20 in which the coherent light source apparatus comprises a multicolor light source.

22. A method for projecting color display information, comprising:

directing a multi-color light from a location directly under a projection lens, toward a front side outer surface of a dichroic cross-combiner assembly having a plurality of side outer surfaces, a top outer surface and a bottom outer surface;

splitting the multi-color light into at least blue, green, and red light, in the diachronic cross-combiner assembly, and directing the splitted blue, green, and red light toward three micromirror display devices correspondingly facing three other side outer surfaces of the dichroic cross-combiner assembly;

reflecting the blue, green, and red light from the three micromirror display devices back into the diachronic cross-combiner assembly;

simultaneously combining the blue, green, and red light from the respective micromirror display devices in the dichroic cross-combiner assembly to form a composite image; and directing the composite image toward the projection lens.

23. The method of claim 22 further comprising expanding and collimating the blue, green, and red light, before the blue, green, and red light reach the three respective micromirror display devices.

* * * * *